(12) United States Patent  (10) Patent No.: US 8,674,951 B2
Ferren et al.  (45) Date of Patent: Mar. 18, 2014

(54) CONTOURED THUMB TOUCH SENSOR APPARATUS

(75) Inventors: Bran Ferren, Beverly Hills, CA (US); Timothy E. Hansen, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 912 days.

(21) Appl. No.: 12/646,220

(22) Filed: Dec. 23, 2009

(65) Prior Publication Data

US 2010/0315356 A1  Dec. 16, 2010

Related U.S. Application Data

(60) Provisional application No. 61/187,520, filed on Jun. 16, 2009.

(51) Int. Cl.
*G06F 3/041* (2006.01)
*G06F 3/045* (2006.01)

(52) U.S. Cl.
USPC .......................................... 345/173; 345/174

(58) Field of Classification Search
None
See application file for complete search history.

(56) References Cited

U.S. PATENT DOCUMENTS

| 5,355,148 A * | 10/1994 | Anderson ..................... 345/166 |
| 5,801,918 A * | 9/1998 | Ahearn et al. ............ 361/679.55 |
| 7,002,553 B2 | 2/2006 | Shkolnikov |
| 2006/0197750 A1* | 9/2006 | Kerr et al. ..................... 345/173 |
| 2007/0144795 A1 | 6/2007 | Tran |
| 2007/0264743 A1* | 11/2007 | Vaganov et al. ................ 438/51 |
| 2008/0079692 A1* | 4/2008 | Liang et al. .................... 345/156 |
| 2009/0103250 A1 | 4/2009 | Takashima et al. |
| 2010/0134424 A1* | 6/2010 | Brisebois et al. ............ 345/173 |
| 2010/0315356 A1 | 12/2010 | Ferren et al. |

FOREIGN PATENT DOCUMENTS

| CN | 101393480 | 3/2009 |
| DE | 102005032413.4 | 1/2007 |
| EP | 1014295 A2 | 6/2000 |
| EP | 1293928 A2 | 3/2003 |
| GB | 2309325 A | 7/1997 |
| JP | H06-111695 A | 4/1994 |
| JP | 07160396 A | 6/1995 |
| JP | 2009025881 A | 2/2009 |
| JP | 2009025881 A | 2/2009 |
| WO | 9858346 A1 | 12/1998 |
| WO | 0135328 A1 | 5/2001 |
| WO | 2006022713 | 3/2006 |
| WO | 2006080858 | 8/2006 |
| WO | 2007147507 | 12/2007 |

OTHER PUBLICATIONS

First Office Action Mailed Sep. 30, 2010, United Kingdom Patent Application No. 1009712.9.

(Continued)

*Primary Examiner* — Joseph Haley
*Assistant Examiner* — Emily Frank
(74) *Attorney, Agent, or Firm* — Kacvinsky Daisak Bluni PLLC

(57) ABSTRACT

Embodiments of an apparatus, system and method are described for implementing a contoured thumb touch sensor. An apparatus may comprise, for example, an input device configured on a side of an apparatus, the input device having a concave shape in a direction from a top of the apparatus to a bottom of the apparatus, the input device comprising a touch-sensitive surface operative to detect movement input. Other embodiments are described and claimed.

17 Claims, 5 Drawing Sheets

(56) References Cited

OTHER PUBLICATIONS

Office Action received for Chinese Patent Application No. 201010208647.5, mailed Jun. 14, 2012, 18 pgs. including 11 pgs. English translation.
First Office Action received for Japanese Patent Application No. 2010-097573, mailed Dec. 6, 2011, 4 pgs. including 2 pgs. English translation.
Second Office Action received for Japanese Patent Application No. 2010-097573, mailed Mar. 27, 2012, 2 pgs. including 1 pg. English translation.
Second Office Action received for UK Patent Application No. 1009712.9 , mailed Aug. 26, 2011, 7 pgs.
First Office Action received for Korean Patent Application No. 10-2010-56463, mailed Jul. 22, 2011, 8 pgs. including 4 pgs. English translation.
First Office Action received for German Patent Application No. 10 2010 018 864.6 , mailed Dec. 15, 2010, 7 pgs. including 3 pgs. English translation.
Ferren et al., "Computing Sensor", U.S. Appl. No. 29/450,312, filed Mar. 15, 2013, 9 pages.
Ferren et al., "Computing Sensor", U.S. Appl. No. 29/450,316, filed Mar. 15, 2013, 7 pages.

\* cited by examiner

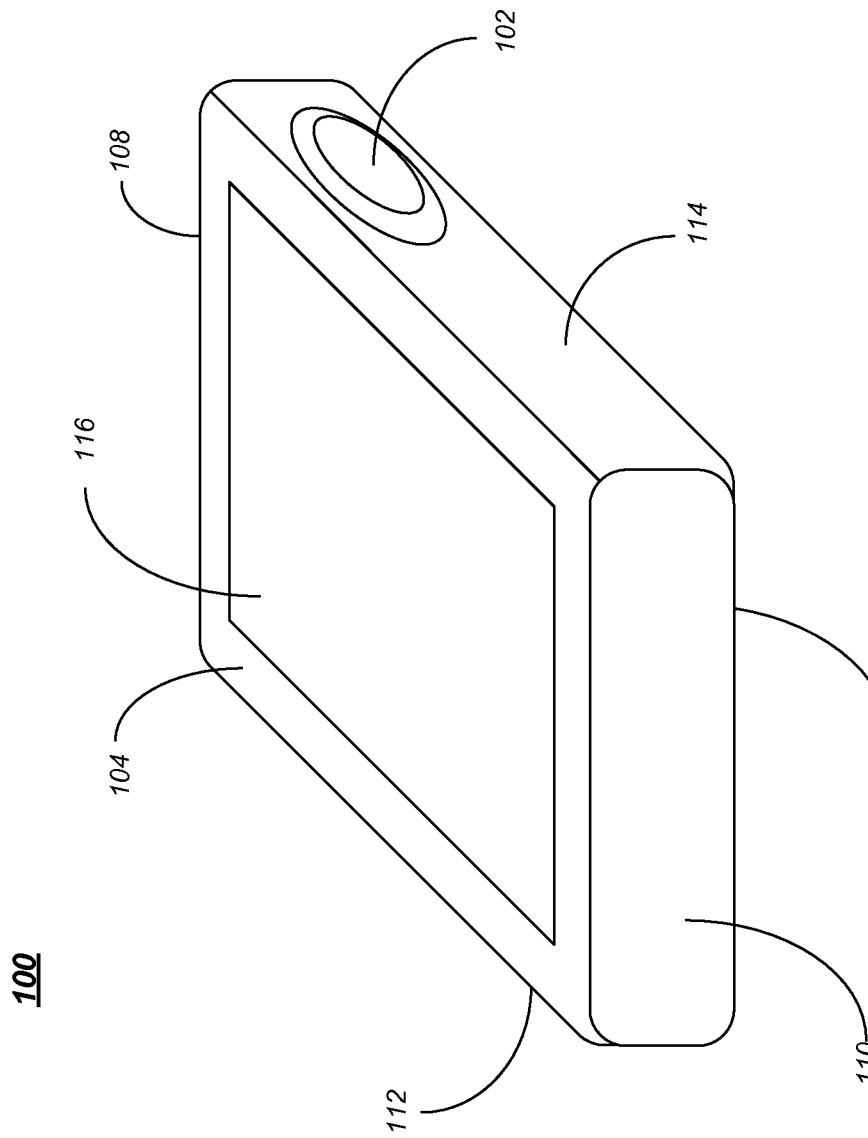

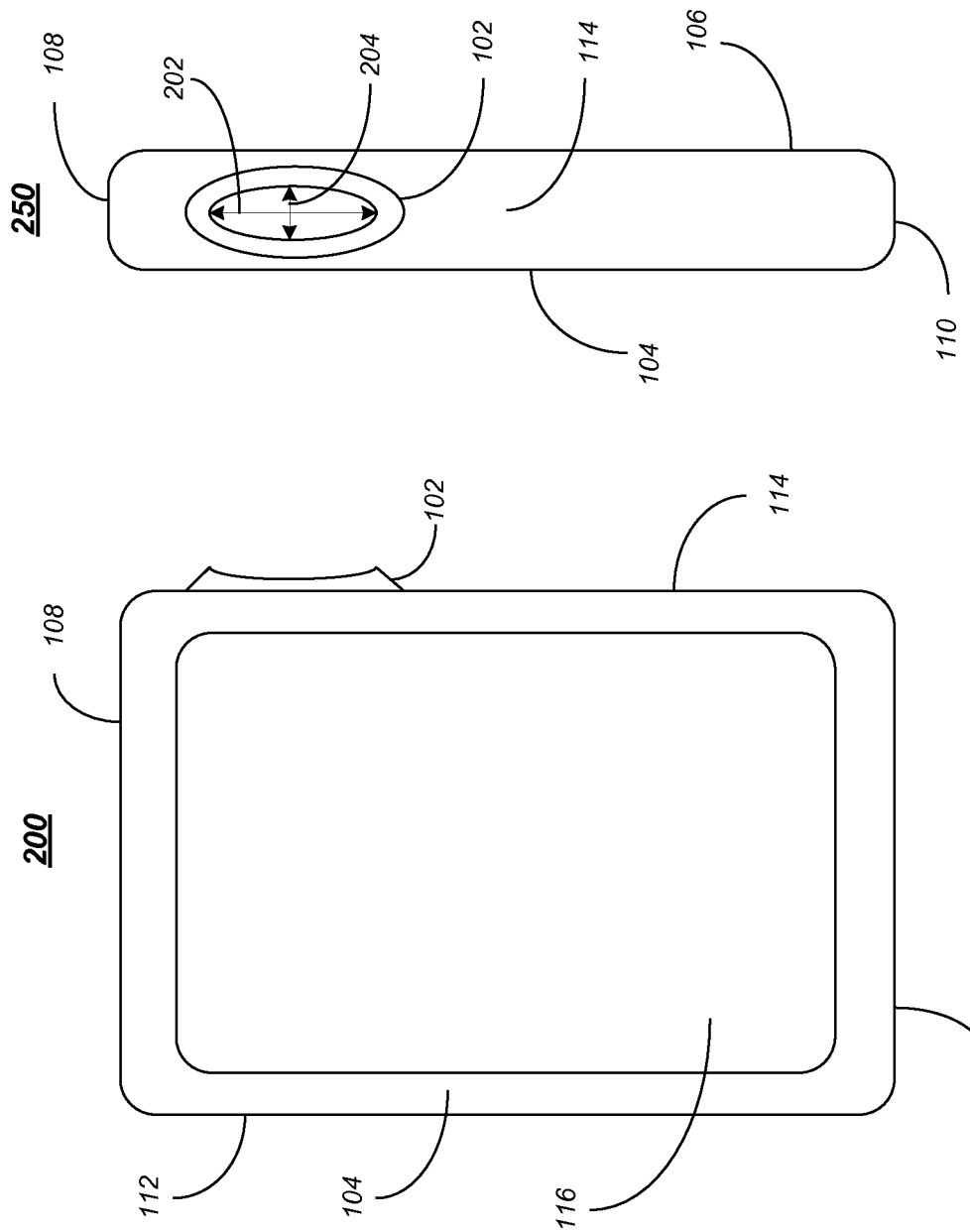

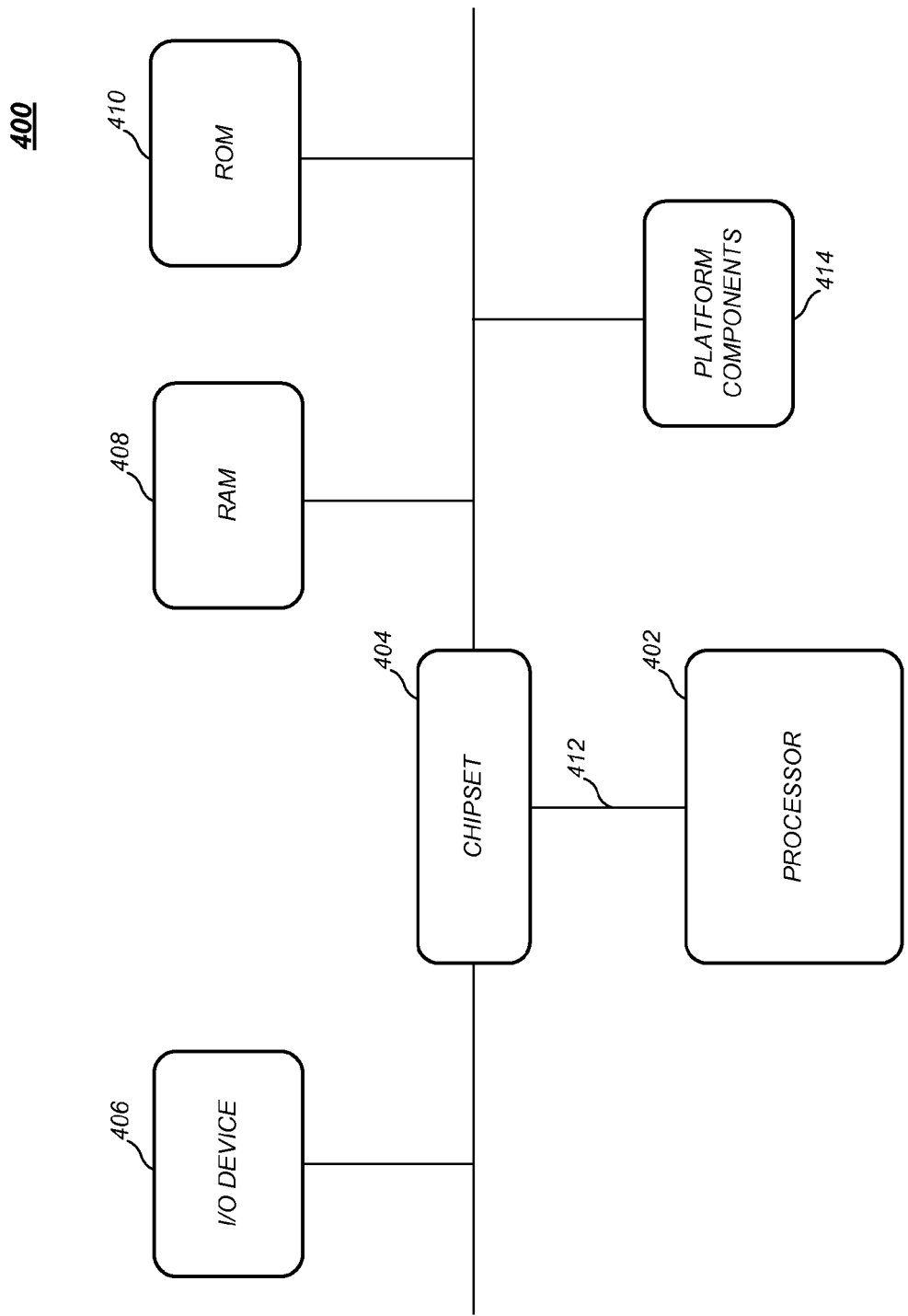

ns the instru-
CONTOURED THUMB TOUCH SENSOR APPARATUS

RELATED APPLICATIONS

This application claims priority to the commonly-owned provisional U.S. patent application Ser. No. 61/187,520, entitled "MULTI-MODE HANDHELD ELECTRONIC DEVICE", filed Jun. 16, 2009 and U.S. Ser. No. 61/265,726, entitled "UNIPOINT SENSOR DEVICE", filed Dec. 1, 2009, both of which are hereby incorporated by reference in their entirety.

BACKGROUND

Modern computing systems continue to evolve in variety of ways. One particular area in which computing systems have evolved is ergonomics and form factor design. Many modern computing systems include a plurality of input mechanisms for performing a variety of functions. The inclusion of a plurality of input mechanisms has resulted in increased complexity without necessarily improving the user experience. As the ergonomics and form factor design of computing systems continue to evolve, improvements in user interactions with the systems and ease of use become important considerations. As a result, it is desirable to provide input mechanisms that are designed and arranged for ease of use, efficiency and improved productivity. Consequently, there exists a substantial need for an apparatus including a contoured thumb touch sensor.

BRIEF DESCRIPTION OF THE DRAWINGS

FIG. 1 illustrates one embodiment of a first apparatus.
FIG. 2A illustrates one embodiment of a second apparatus.
FIG. 2B illustrates one embodiment of a third apparatus.
FIG. 4 illustrates one embodiment of a system.

DETAILED DESCRIPTION

Figure 2C:
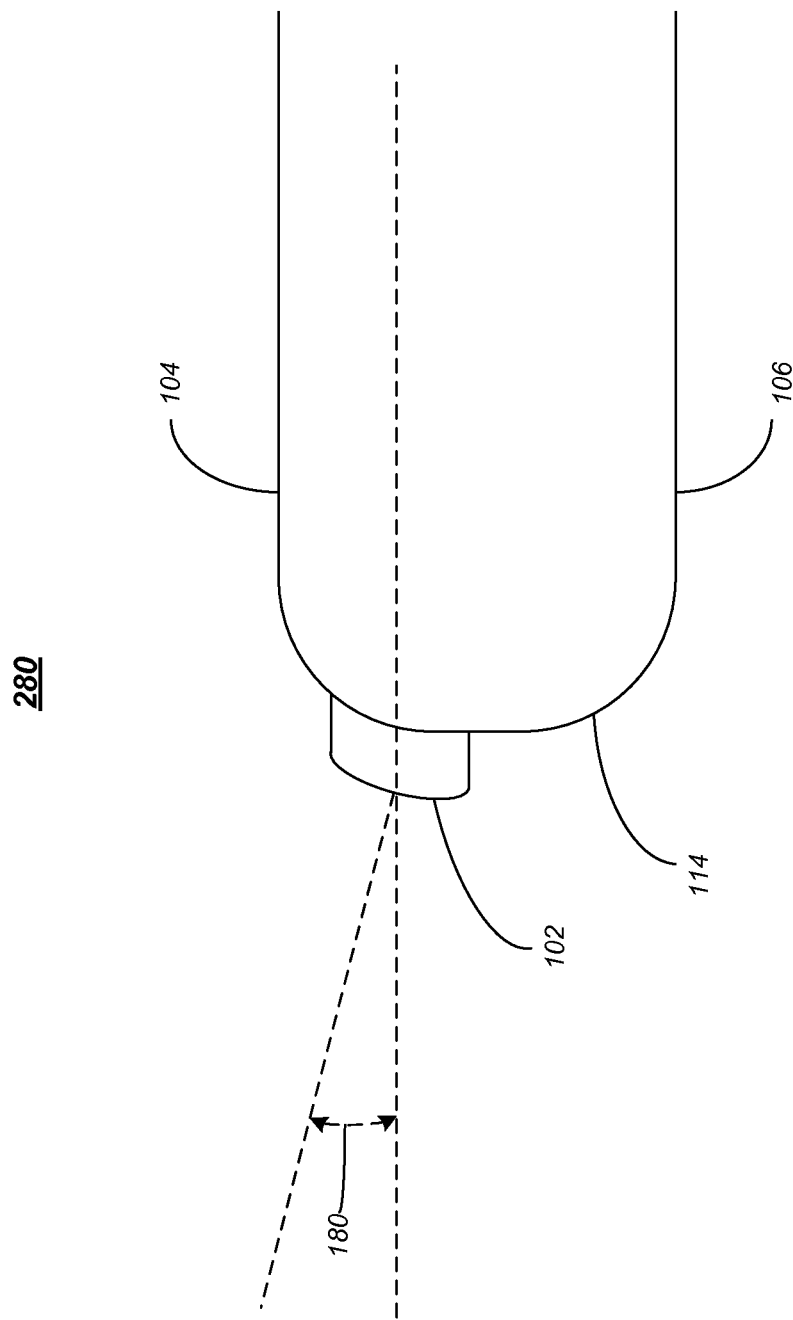
FIG. 2C illustrates one embodiment of a fourth apparatus.

Embodiments are generally directed to techniques designed to improve the design, ergonomic functionality and user experience in computing systems. Various embodiments include an apparatus and system including a touch sensitive input device having a concave shape in a direction from a top of the apparatus to a bottom of the apparatus. In some embodiments, the input device comprises a touch-sensitive surface configured on a side of the apparatus that is operative to detect movement input. Other embodiments are described and claimed.

Many modern computing systems, including but not limited to Smartphones, PDAs, mobile computing devices, handheld computing devices, cellular or mobile phones and mobile internet devices, include a plurality of input mechanisms designed to allow a user to interact with and control the mobile computing device. For example, a mobile computing device may include a touch sensitive display screen that allows a user to select a desired object shown on the display screen by simply touching the object with a finger or a stylus or by otherwise selecting the object. Mobile computing devices often include, in addition to or in place of the touchscreen, a scroll wheel, trackball, five-way-selector switch or other input mechanism to assist with cursor control, scrolling or other interactive actions associated with the use of a mobile computing device.

The variety of input mechanisms, while functional, are often not designed to specifically accommodate the instrument with which they most often interact, e.g. a human hand, thumb and fingers. For example, when a user grasps a mobile computing device, the motion of the tip of the thumb can be approximated by a two-degree-of-freedom system characterized by the articulation of the distal phalanx relative to the proximal phalanx and the articulation of the carpometacarpal joint. The resulting manifold to which a thumb tip is constrained is non-planar. Accordingly, many users experience difficulty when attempting to maintain uniform contact between their thumbs and planar touch-sensitive surfaces on many of today's mobile computing devices. To address these and other problems, in some embodiments, a contoured or saddle shaped, touch-sensitive surface or interface is described that can be operated in a comfortable and intuitive manner by a user's thumb. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment. While certain embodiments described herein refer to certain orientations and directions, it should be understood that any orientation or direction of implementation could be used and still fall within the described embodiments. Furthermore, it should also be understood that the directions (e.g. top, bottom, left, right, front and back) described herein refer to directions associated with the views illustrated in the corresponding figures. Other embodiments are described and claimed.

FIG. 1 illustrates one embodiment of a first apparatus. FIG. 1 illustrates a block diagram of an apparatus 100. Apparatus 100 may comprise a computing system 100, such as a mobile computing device, in some embodiments. As shown in FIG. 1, mobile computing device 100 comprises multiple elements, such as contoured sensor 102, display 116 and a plurality of surfaces including front 104, back 106, top 108, bottom 110, left 112 and right 114. Surfaces 104, 106, 108, 110, 112 and 114 may form or define an enclosure for mobile computing device 100 in some embodiments. A limited number and configuration of elements are shown for purposes of illustration and not limitation. It should be understood that the described embodiments of contoured sensor 102 could be implemented on any mobile computing device having any number of different sizes, shapes and configurations, not limited to those described herein. As such, the embodiments are not limited to the elements or the configuration shown in FIG. 1 or the remaining figures.

In various embodiments, computing system 100 may include a display 116. The display 116 may comprise a cathode ray tube (CRTs), liquid crystal displays (LCDs), light emitting diode displays (LEDs), organic light emitting diode displays (OLEDs) or any other type of display. In some embodiments, the display 116 may comprise a touch-sensitive or multi-touch-sensitive display operative to detect the presence and location of a touch within the display area. For example, the touch may generally refer to touch or contact to the display of the device by a finger, hand or other object such as a stylus. Other embodiments are described and claimed.

As shown in FIG. 1, mobile computing device 100 may include a plurality of sides or surfaces 104, 106, 108, 110, 112 and 114 that form or define an enclosure in some embodiments. For example, mobile computing device 100 may include a front 104 and an opposing back 106 (not visible in FIG. 1), a top 108 (not visible in FIG. 1) and an opposing bottom 110, and a left 112 (not visible in FIG. 1) and an opposing right 114. In various embodiments, the opposing sides may comprise substantially parallel planes. In some embodiments, front 104 may be configured to include display 116.

In some embodiments, mobile computing device 100 may include a contoured sensor 102. Contoured sensor 102 may comprise a touch-sensitive input device configured on a side of the mobile computing device 100 in some embodiments. While shown in FIG. 1 as being implemented on the right side 114 of mobile computing device 100, it should be understood that contoured sensor 102 could be configured anywhere on mobile computing device 100 and still fall within the described embodiments. Other embodiments are described and claimed.

Contoured sensor 102 may be configured on right side 114 of mobile computing device 100, in various embodiments, to accommodate one-handed use of mobile computing device 100. For example, a user may hold mobile computing device 100 in their right hand such that back side 106 faces the palm of the user's hand and front side 104 and display 116 are visible to the user. In this manner, the user's right thumb may be positioned on contoured sensor 102. Similarly, in some embodiments, contoured sensor 102 may be located on left side 112 of mobile computing device 100 such that a user may hold mobile computing device 100 in their left hand and their left thumb may be positioned on contoured sensor 102. In some embodiments, mobile computing device 102 may be operative in a landscape mode such that the right side 114 is facing up and contoured sensor 102 is positioned on the relative top of the device such that a user's index finger may be position over the contoured sensor 102 for operation. Other embodiments are described and claimed.

In various embodiments, contoured sensor 102 may comprise an input device having a touch-sensitive surface operative to detect movement input. For example, in some embodiments, the touch-sensitive surface may comprise one or more capacitive touch sensors, one or more optical sensors, or a combination of capacitive touch and optical sensors. The touch-sensitive surface of contoured sensor 102 may be selected such that it is capable of detecting small movements, such as the sliding or rolling of a human thumb that remains in contact with the contoured sensor 102. In various embodiments, contoured sensor 102 may include or be controlled by an algorithm that is configured to accurately adjust for the sideways orientation of a thumb or finger on the sensor. For example, a traditional trackpad, such as a laptop trackpad, may include an algorithm that expects operational contact only from a salient finger tip. The algorithm associated with the contoured sensor 102, on the other hand, may be operative to account for the unusual orientation of the thumb or digit to the sensor surface. In various embodiments, the algorithm associated with the contoured sensor 102 may be derived using an ellipsoidal approximation of the contact area of the thumb or digit, and by using one foci to offset the analyzed point. In another embodiment, a three-dimensional capacitive field spatial analysis may be implemented to solve for the orientation of the thumb or digit. Other embodiments are described and claimed.

The contoured sensor 102 may comprise a pressure sensitive surface to detect pressure input in some embodiments. For example, in addition to detecting movement input, contoured sensor 102 may additionally be operative to detect pressure input such as a button press or mouse click type of input. In various embodiments, mobile computing device 100 may include one or more buttons configured on a same side of the enclosure as the contoured sensor 102 and located above the contoured sensor 102 in a direction of the top 108 of the enclosure or below the contoured sensor 102 in a direction of the bottom 110 of the enclosure. In this manner, additional functionality may be implemented using the additional buttons while allowing the user to maintain a comfortable and natural grip on the device 100. It should be understood that any number or type of additional buttons, switches or input devices may be implemented on mobile computing device 100 and still fall within the described embodiments.

In some embodiments, the contoured sensor may include one or more lighting elements operative to illuminate when the input device is active. For example, one or more light emitting diodes (LEDs) may be configured behind a translucent surface of contoured sensor 102 and may illuminate when contoured sensor 102 is available for use. In addition to the sensor being illuminated when available for use, in some embodiments, the sensor may be illuminated to represent or indicate feedback to usage. For example, a "heat map" like trail across the surface may be visible to indicate a path of usage. In various embodiments, this visual input may additionally enhance the aesthetics of the device 100, and may include bright or neon colors that stand out and are highly visible. In some embodiments, customizable color schemes and the ability to strobe the colors across the surface may also be available. In various embodiments, the contoured sensor 102 may also illuminate for aesthetic reasons when the device 100 or the sensor 102 is passive, or to indicate receipt of a message or other communication parameter. In some embodiments, the contoured sensor 102 may comprise or include an infrared sensor and/or a biometric sensor. An infrared sensor may be used, in various embodiments, for detecting a use's temperature, heart rate, blood pressure, or any other parameter. In some embodiments, a biometric sensor may be included and may be operative to identify a user for purposes of security or authentication, for example. Other embodiments are described and claimed.

The touch-sensitive surface of the contoured sensor 102 may comprise or consist of a material selected to have a low coefficient of friction ratio compared to human skin. For example, it may be desirable to select a material for the touch-sensitive surface of contoured sensor 102 that allows the skin of a human thumb to easily slide or glide over the material. In some embodiments, the material may comprise Teflon or any other suitable material.

The contoured sensor 102 may be operative to output a signal to control one or more components of the mobile computing device 100 or a cursor on display 116 of the mobile computing device 100, in some embodiments. For example, movement information that is detected or sensed by contoured sensor 102 may be interpreted as coordinates on display 116. In various embodiments, for example, up and down movement in a direction from top 108 to bottom 110 or from bottom 110 to top 108 on contoured sensor 102 may be interpreted as up and down movement of a cursor or as an up and down scrolling movement. Similarly, movement in a direction from front 104 to back 106 or from back 106 to front 104 may be interpreted as left to right movement of a cursor on the display.

In some embodiments, contoured sensor 102 may be used to control any number of components of mobile computing device 100, such as controlling zoom or aim of an integrated camera for example. Contoured sensor 102 may also be used or configured for any number of specialty purposes, such as selecting line width or density when drawing or selecting special characters, different fonts, different colors, upper and lower case characters or any number of other parameters when typing. It should be understood that the uses and functionality of the contoured sensor 102 described herein are provided for purposes of illustration and not limitation. As such, a person of ordinarily skill in the art would appreciate that the contoured sensor 102 described herein could be used for any number of purposes and still fall within the described embodiments. Other embodiments are described and claimed.

In various embodiments, the contoured sensor 102 may have a shape defined by two radii of curvature, one concave and one convex, with the larger concave radius corresponding to the articulation of the distal phalanx relative to the proximal phalanx of a human thumb and the smaller convex radius corresponding to the articulation of the carpo-metacarpal joint of a human hand. In some embodiments, the contoured sensor may have a concave shape in a direction from top 108 to bottom 110. In some embodiments, the concave curvature may be selected to substantially match or accommodate the curvature of a human thumb pad, tip or other physical contact point during articulation. In various embodiments, the contoured sensor 102 may have a convex shape in a direction from front 104 to back 106. The convex curvature may, in some embodiments, allow for ease of movement as a portion of a human thumb rolls or scrolls across the surface of the contoured sensor 102 in a direction from front 104 to back 106 or from back 106 to front 104. While various embodiments are described with reference to concave and convex curvatures of the contoured sensor 102 and various placements of the contoured sensor 102 on the device 100, it should be understood some embodiments include a contoured sensor 102 having a shape, feel and placement on device 100 selected to allow a thumb to rest comfortably in a groove created by the sensor, thereby allowing comfortable swiping, rubbing or other motions by the thumb. In various embodiments, the dual concave and convex curvature of the contoured sensor 102 may allow a user to naturally maintain uniform contact pressure with the sensor as the user moves through the range of motion defined by the extents of the sensor. In some embodiments, this may help to ensure that the user does not lift or remove the contact point from the surface of the sensor which may result in spurious control inputs, and may also result in more accurate pressure measurements while the thumb or other digit is moving in embodiments where pressure sensitivity may be enabled. Other embodiments are described and claimed.

FIGS. 2A and 2B illustrate embodiments of an apparatus 200 and an apparatus 250 respectively. Apparatus 200 and apparatus 250 may comprise a computing system, such as a mobile computing device that may be the same or similar to mobile computing device 100 of FIG. 1. As shown in FIGS. 2A and 2B, like elements have been numbered to correspond to similar elements of mobile computing device 100 of FIG. 1. In some embodiments, FIG. 2A illustrates a perspective view looking directly down on front surface 104. FIG. 2B illustrates, in various embodiments, a perspective view looking at right side 114 with front 104 facing to the left in the figure and back side 106 facing to the right in the figure. Other embodiments are described and claimed.

In various embodiments, as shown in FIG. 2A, contoured sensor 102 may be configured to protrude from a side of computing device 200, such as right side 114, for example. In some embodiments, the enclosure may be configured to include a protruding surface extending from one side of the enclosure in a direction opposite an opposing side of the enclosure. For example, a protrusion may extend from right side 114 in a direction away from opposing left side 112. The concave shape of the contoured sensor 102 may extend into an area defined by the protruding surface and the surface from which the protruding surface extends in some embodiments. For example, the protruding surface may extend away from right side 114 and contoured sensor 102 may include a concave curvature having a low point of its curved radius configured below a high point of the protruding surface. In some embodiments, the low point of the curved radius is selected to avoid extending beyond a plane defined by right side 114 and to avoid impeding upon space inside the enclosure otherwise needed for internal components of mobile computing device 100. In this manner, contoured sensor 102 may be raised off of the side 114 of the enclosure to assist a user in easily locating the sensor 102 and orienting the device 100 and to provide a catch to prevent the mobile computing device 100 from slipping through a user's fingers, for example. In various embodiments, all surfaces, corners and/or edges of the device 100, including any protrusion associated with the contoured sensor 102, may be selected such that the overall device feels smooth to the touch and does not resist movement of the thumb in any direction.

In some embodiments, arrows 202 of FIG. 2B may illustrate the direction of the concave curvature of contoured sensor 102. The direction illustrated by arrows 202 may comprise a direction from top 108 to bottom 110. The arrows 204 of FIG. 2B may illustrate the direction of the convex curvature of contoured sensor 102 in some embodiments. For example, the direction of arrows 204 may comprise a direction from the front 104 to the back 106. Other embodiments are described and claimed.

Figure 3:
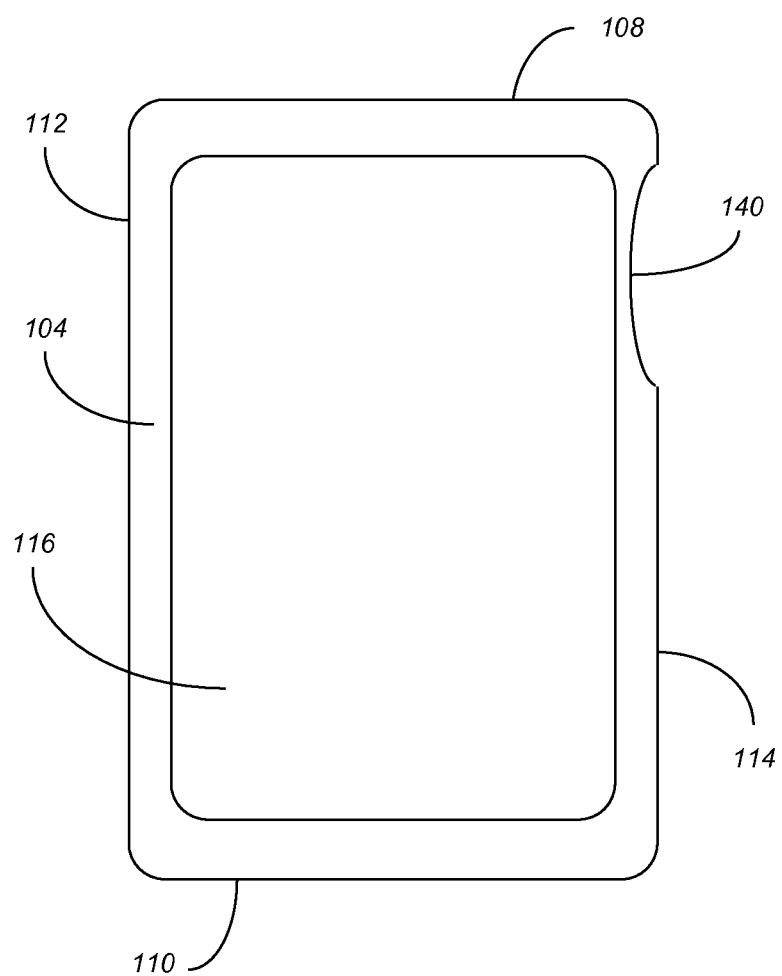
FIG. 3 illustrates one embodiment of a fifth apparatus.

As shown in FIG. 3, where like element are similarly numbered to the embodiments described with reference to FIGS. 1, 2A and 2B, contoured sensor 140, which may be the same or similar to contoured sensor 102, may be configured such that the concave shape of the sensor 140 extends into an area defined by the enclosure. For example, the contoured sensor 140 may form a concave impression in one side of the enclosure, such as side 114. In this manner, the contoured sensor 140 may be recessed into the enclosure. It should be understood that the positions and configurations described herein are provided for purposes of illustration and not limitation and that other embodiments, positions and configurations are possible and still fall within the described embodiments.

FIG. 2C illustrates one embodiment of an apparatus 280 which may be the same or similarly to apparatus 100, apparatus 200 and apparatus 250 of FIGS. 1, 2A and 2B. Like elements may be numbered similarly in FIG. 2C. FIG. 2C may comprise a perspective view of mobile computing device 280 from the top 108 toward the bottom 110, wherein the front 104 is facing up in the figure and the back 106 is facing down in the figure.

In some embodiments, as shown in FIG. 2C, the contoured sensor 102 may be configured on a side 114 of the mobile computing device 280 and may be canted or angled toward a front of the mobile computing device 280, wherein the front of the mobile computing device includes a display as shown in FIG. 1. The dashed lines and item 180 in FIG. 2C illustrate the angle at which the contoured sensor 102 may be canted. In some embodiments, the angle 180 at which the contoured sensor 102 is canted may comprise 15 degrees, for example. In some embodiments, canting the contoured sensor 102 toward the front of the device may further ease operation and improve the ergonomic feel of the device 280 and the contoured sensor 102 based on a normal or natural position of a human thumb when holding the device 280.

The contoured sensor 102 may be canted toward the front of the device when, for example, the device 280 is configured with the protruding surface as described above with reference to FIG. 2A or when the device 280 is configured such that the contoured sensor 102 forms a concave impression in the side of the device 280, as shown in FIG. 3. In some embodiments, for example, the contoured sensor 102 and the protruding surface or the concave impression may be canted toward the front of the device. Other embodiments are described and claimed.

In various embodiments, the contoured sensor 102 (and 140) of FIGS. 1, 2A, 2B, 2C and 3 are operative to enable one-handed orientation and manipulation of a mobile computing device. For example, the concave curvature of the sensor 102 along the long edge or side 114 of the mobile computing device 100 may allow a user to orient the device 100 for operation in a single hand without viewing the device 100. In particular, the device 100 may be oriented by 1) grasping the device 100 from above, between the thumb and an opposing finger, near the midpoints of the long edges or sides 112 and 114, 2) sliding the device 100 (using the weight of the device, for example) until the thumb locates in the notch created by the concave curvature of the contoured sensor 102, and then 3) pivoting the device 100 into the palm of the hand. Stated differently, the same natural sequence of motions used when intuitively removing the device 100 from a pocket, for example, may be used to orient the device.

In some embodiments, implementation of the contoured sensor 102 may allow a user to naturally and comfortably maintain uniform contact pressure with the touch-sensitive surface throughout a natural range of motion and use scenarios. Additionally, in some embodiments, at least two dimensions of motion (e.g. up/down, left/right) may be detected by the contoured sensor 102 and may be output to the mobile computing device 100 and mapped to at least two dimensions of thumb articulation, yielding more intuitive control of on-screen cursors and other interactive elements. In some embodiments, the concavity of the contoured sensor in one dimension may additionally reduce the size of the contact patch between a thumb and the touch surface, which may improve the accuracy of capacitive touch sensing measurements. Other embodiments are described and claimed.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines. In some embodiments, chipset 404 may be interested or packaged with processor 402. Other embodiments are described and claimed.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Various embodiments may be implemented as a method, such as a method of manufacturing and/or a method of using the above described embodiments of mobile computing devices and contoured sensors. It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
an input device configured on a side of the apparatus, the input device having a touch-sensitive surface operative to detect movement input, the touch-sensitive surface comprising a saddle shape having a concave shape in at least one direction having a first radius of curvature and a convex shape in a direction substantially perpendicular to the direction of the concave shape having a second radius of curvature smaller than the first radius of curvature.

2. The apparatus of claim 1, the input device having one or more capacitive touch sensors, one or more optical sensors, or a combination of capacitive touch and optical sensors.

3. The apparatus of claim 1, the input device operative to output a signal to control one or more components of the apparatus.

4. The apparatus of claim 1, the input device configured on a side of the apparatus and canted toward a front of the apparatus, wherein the front of the apparatus includes a display.

5. The apparatus of claim 1, the input device comprising a pressure sensitive surface to detect pressure input.

6. The apparatus of claim 1, wherein the input device is operative to enable one-handed orientation and manipulation of the apparatus.

7. The apparatus of claim 1, the input device comprising one or more lighting elements operative to illuminate when the input device is active, when the device input device is passive or to indicate receipt of a message or other communication parameter.

8. The apparatus of claim 1, wherein the touch-sensitive surface of the input device comprises a material selected to have a low coefficient of friction ratio compared to human skin.

9. The apparatus of claim 1, the concave shape to accommodate a human thumb.

10. A mobile computing device, comprising:
an enclosure having a plurality of opposing surfaces, wherein at least a first surface includes a display and at least one different surface includes an input device comprising a touch-sensitive surface operative to detect movement input, the touch-sensitive surface comprising a saddle shape having a concave shape in at least one direction having a first radius of curvature and a convex shape in a direction substantially perpendicular to the direction of the concave shape having a second radius of curvature smaller than the first radius of curvature.

11. The mobile computing device of claim 10, comprising:
a protruding surface extending from one surface of the enclosure in a direction opposite an opposing side of the enclosure, wherein the concave shape of the input device extends into an area defined by the protruding surface and the surface from which the protruding surface extends.

12. The mobile computing device of claim 11, wherein the protruding surface and the input device are canted toward the first surface of the mobile computing device.

13. The mobile computing device of claim 10, wherein the concave shape of the input device extends into an area defined by the enclosure forming a concave impression in one side of the enclosure.

14. The mobile computing device of claim 13, wherein the concave impression and the input device are canted toward the first surface of the mobile computing device.

15. A system, comprising:
a display;
one or more processors; and
an enclosure to house the display and the one or more processors, the enclosure having an integrated input device comprising a touch-sensitive surface operative to detect movement input, the touch-sensitive surface comprising a saddle shape having a concave shape in at least one direction having a first radius of curvature and a convex shape in a direction substantially perpendicular to the direction of the concave shape having a second radius of curvature smaller than the first radius of curvature.

16. The system of claim 15, wherein the input device includes an infrared or biometric sensor.

17. The system of claim 15, comprising:
one or more buttons configured on a same side of the enclosure as the input device and located above or below the input device.

* * * * *